United States Patent [19]

Nogues

[11] Patent Number: 4,735,992

[45] Date of Patent: Apr. 5, 1988

[54] POLYMERS OBTAINED FROM OLIGOMERS OF ANHYDRIDE-GRAFTED POLYPROPYLENE, MANUFACTURING PROCESS AND USES

[75] Inventor: Pierre Nogues, Evreux, France

[73] Assignee: Societe Atochem, Paris, France

[21] Appl. No.: 937,437

[22] Filed: Dec. 3, 1986

Related U.S. Application Data

[63] Continuation of Ser. No. 780,382, Sep. 26, 1985, abandoned.

[30] Foreign Application Priority Data

Sep. 27, 1984 [FR] France .................... 84 14880

[51] Int. Cl.$^4$ .............................. C08L 51/00
[52] U.S. Cl. ........................... 525/64; 525/65; 525/66; 525/69; 525/79
[58] Field of Search ............ 525/64, 65, 69, 285, 525/66, 79

[56] References Cited

U.S. PATENT DOCUMENTS

| | | | |
|---|---|---|---|
| 4,146,590 | 3/1979 | Yamamoto et al. | 525/168 |
| 4,147,740 | 4/1979 | Swiger et al. | 525/285 |
| 4,382,128 | 5/1983 | Li | 525/285 |
| 4,548,985 | 10/1985 | Yazaki et al. | 525/65 |
| 4,550,130 | 10/1985 | Kishida et al. | 525/65 X |

*Primary Examiner*—Theodore E. Pertilla
*Attorney, Agent, or Firm*—Burgess, Ryan & Wayne

[57] ABSTRACT

Polymers resulting from the association of two reactive components having a low melt viscosity, characterized in that one of the components is a polypropylene modified by grafting an unsaturated monomer bearing an acid anhydride group and the other is a compound R posessing at least two groups which are reactive towards this anhydride group.

Uses in the manufacture of moulded articles by the reaction-injection-moulding technique, or in the manufacture of composite materials.

Uses as coatings for metallic articles.

5 Claims, No Drawings

POLYMERS OBTAINED FROM OLIGOMERS OF ANHYDRIDE-GRAFTED POLYPROPYLENE, MANUFACTURING PROCESS AND USES

This application is a continuation of application Ser. No. 780,382, filed 9-26-85, now abandoned.

It is known from British Patent No. 932,514, French Patent No. 2,519,013 and U.S. Pat. Nos. 4,059,650 and 4,382,128 that certain of the physical or mechanical properties of polyolefins can be advantageously modified by creating active sites on the polyolefins and crosslinking them with polyfunctional compounds capable of reacting with these active sites.

These grafting reactions concerned polyolefins of high molecular weight.

On the other hand, the present invention employs polypropylene of low molecular weight and hence of low melt viscosity.

It relates to new polymers which are produced by merely mixing two components which, in this way, react with each other, these two components both having a low melt viscosity and one of them being a polypropylene modified by grafting a monomer bearing an acid anhydride group, and the other a compound possessing at least two groups which are reactive towards this anhydride group, a compound which, for the sake of convenience, we shall call a reactive compound or "compound R" in what follows.

Both of these components, taken in isolation, have relatively low molecular masses and, consequently, exceedingly poor mechanical properties, this is not so in the case of the products resulting from their reaction, real polymers which, because of their advantageous physical and mechanical properties, will find applications in the usual fields where plastics are employed.

Numerous methods have been suggested for preparing the first component, grafted polypropylene.

By grafted polypropylene (PPg) we refer to all the propylene homopolymers or copolymers with various monomers (be they block or random, provided that these copolymers contain at least 50 mole % of propylene) on which an unsaturated monomer bearing an acid anhydride group has been grafted.

This grafting monomer is a compound bearing at least one double bond which is active in radical polymerization, and at least one cyclic acid anhydride group with five centres.

This may be maleic, citraconic, 2-methylmaleic, 2-chloromaleic, 2-methoxycarbonylmaleic, 2,3-dimethylmaleic, 2,3-dichloromaleic, 2,3-dimethoxycarbonylmaleic, bicyclo[2.2.1]hept-5-ene-2,3-dicarboxylic, or 4-methylcyclohex-4-ene-1,2-dicarboxylic anhydride, this list not being restrictive in any way.

To produce the grafting, sites may be prepared on the polypropylene chain by treatment with initiators of the perioxide or diazo type, or by electromagnetic treatment, sites at which the anhydride will be grafted by a radical mechanism.

The activation and the grafting may also be carried out simultaneously by subjecting a suspension of polypropylene powder in a liquid, or a solution of polypropylene in a suitable solvent, to the action of a peroxide (U.S. Pat. No. 2,970,129); it is also possible to carry out the operation in a gas stream (U.S. Pat. No. 3,414,551), the solvent or the gas stream containing the appropriate quantity of the grafting monomer defined earlier.

It is also possible to carry out the operation in a molten state.

It is well known that, where the polypropylene or propylene copolymer chain is concerned, these reactions are accompanied by chain-scission reactions and as a result reduce the molecular mass of the polymer and, consequently, its melt viscosity.

This degradation effect may be restricted by involving the reactions of the monomer to be grafted or, on the other hand, may be increased by the disproportionation and transfer reactions of this same monomer.

However, in the majority of cases, PPg's are produced with much lower melt viscosities than those of the polymers from which they originated, in other words oligomers.

The PPg's employed for the manufacture of the polymers which are the subject of the present invention should have a melt viscosity below 500 Pa s, measured at 200° C. at a shear rate of 10 s$^{-1}$.

This viscosity has been determined by means of a Rheomat 30, a viscometer with two coaxial cylinders which is manufactured by the Swiss company Contraves.

The compound R of which the molecular weight is less than 50,000 will bear at least two identical or non-identical groups which are reactive towards the acid anhydride group of the PPg; among these reactive groups may be mentioned, among others, the alcohol group, the amine group, the epoxide group and the isocyanate group, this list not being restrictive in any way.

It may therefore be a diol or a triol, or a diamine or triamine, or a compound containing an alcohol group and an amine group at the same time, or two amine groups and one alcohol group, and so on.

Among the compounds R which contain at least two alcohol groups there may be mentioned: ethylene glycol, propylene glycol, 1,3-butanediol, 1,4-butanediol, 1,6-hexanediol, 2-butene-1,4-diol, 1,4-(2-hydroxyethoxy)-1-butanol, 1,2,6-hexanetriol, erythritol, sucrose, glucose, dihydroxyacetone, polyoxyalkylene glycols such as polyoxyethylene glycols, polyoxytetramethylene glycols of various molecular weights, hydroxy derivatives of ethylene/vinyl acetate copolymers and the like, this list not being restrictive in any way.

Among the compounds R containing at least two amine groups, there may be mentioned:

alpha,omega-diamino polyamide oligomers of various molecular weights, the synthesis of which has been described in French Patent Applications Nos. 83/15,859 and 84/13,244 in the name of the Applicant Company;

aliphatic or aromatic diamines such as hexamethylenediamine, nonamethylenediamine, undecamethylenediamine, dodecamethylenediamine, meta-xylylenediamine, bis-p-aminocyclohexylmethane, and the like.

Among the polyepoxy compounds R, the most widely used compounds are those produced by the reaction of bisphenol A with epichlorohydrin and, in particular, the compounds produced by the addition of two molecules of epichlorohydrin to one molecule of bisphenol A, that is to say bisphenol A diglycidyl ethers (BADGE). However, it is possible to use, as the polymers according to the invention, a large number of other epoxy resins such as those produced by attaching an epoxy group at both ends of a parafinic hydrocarbon chain (for example diepoxy derivatives of butanediol), or of a polyether chain, such as alpha, omega-diepoxy polypropylene glycol, marketed by the Dow Chemical Company under the reference DER 732 or DER 736. It is also possible to employ more specific diepoxy compounds, such as vinylcyclohexene dioxide, 3,4-epoxycyclohexylmethyl 3,4-epoxycyclohexanemonocarboxylate, 3-(3,4-epoxycyclohexyl)-8,9-epoxy-2,4-dioxaspiro[5.5]undecane, bis(2,3-epoxycyclopentyl) ether, bis(3,4-epoxy-6-methylcyclohexyl) adipate, resorcinol diglycidyl ether, and the like.

Among the compounds R which contain at least two isocyanate groups we shall mention, among many others:

2,4- or 2,6-tolylene diisocyanate, 4,4'-diphenylmethane diisocyanate, 1,4- or 1,6-hexamethylenediisocyanate, 1,4-cyclohexylene diisocyanate, 3-isocyanatomethyl-3,5,5-trimethylcyclohexyl isocyanate, and triisocyanates such as triphenylmethane triisocyanate, for example.

The respective quantities of the two main components: PPg and compound R which will react together to give the polymers according to the invention will be such that their molarity ratio (MR) defined as follows:

$$MR = \frac{\text{Concentration of reactive groups carried by } R}{\text{Concentration of acid anhydride groups carried by the } PPg};$$

that is:

$$= \frac{\text{Number of reactive groups in } R}{\text{Number of acid anhydride group functions in } PPg}$$

is between 0.01 and 2 and, preferably, between 0.1 and 1, one acid anhydride group corresponding to two carboxylic acid groups.

The reaction will occur on mere mixing of the two components PPg and compound R in the molten state; any plastics conversion equipment which ensures good blending will be suitable, such as a Brabender or Buss blender, a single-screw extruder, or a double-screw extruder of the Werner and Pfleiderer type. The operation may also be carried out in a simple autoclave with good stirring.

Since both components have a low melt viscosity, it is advantageously possible to use the Reaction Injection Moulding (RIM) technique, as described in Modern Plastics International, April 81, to produce the manufacture of the polymer and its moulding into large-sized articles in a single operation. (Thus, this technique makes it possible to obtain mouldings of large size, made from modified polypropylene and having good mechanical properties, while it would be very difficult, if not impossible, to obtain the same articles by injection moulding of ordinary polypropylene, which is too viscous, while with crosslinked polypropylene it would be impossible).

In this case, the two components of the system—PPg and R—are stored in a liquid state in two separate storage containers maintained at a temperature which is sufficient for the two reactants to remain liquid; the polymerization and the moulding of the finished article are produced simultaneously by pumping the required quantity of each of the two reactants from the two storage containers, mixing them in a special device producing a highly intimate mixture of the two components very rapidly, and injecting the mixture produced into the mould. Polymerization of the resin takes place during the mixing of the two components in the mixing head and continues during the transfer into the mould, to be completed in the latter.

It will also be possible to produce profile components by coating, using a "Pultrusion" technique, a glass fibre core which passes continuously through a die, called a crosshead, fed continuously with the liquid mixture of PPg and compound R, the said die having the cross-section of the profile which is to be produced.

These new polymers can also be used as binders in the manufacture of composite materials.

In addition to these two basic components it is also possible to use other compounds which will be added to the reaction mixture, such as dilution polymers, stabilizers against heat, light and oxidation, colourants, plasticizers and various reinforcing or non-reinforcing fillers.

It is also possible to prepare systems which are more complex than the simple two-component system: PPg/R by incorporating therein one or more components which react with PPg or R.

In any event, and in every case, it will be possible to produce finished articles by employing the conventional conversion techniques for thermoplastics, such as extrusion, injection moulding, rotational moulding, thermoforming, etc.

It is also possible to employ these polymeric compounds to coat metal articles and to protect them against corrosion in this way.

To illustrate the invention, we shall mention the following examples, which do not imply any restriction.

EXAMPLE 1

Maleic anhydride is grafted onto a propylene homopolymer in the following manner:

5,500 g of monochlorobenzene 1,200 g of Lacqtene 3050 FNI (polypropylene sold by ATOCHEM—ASTM D 1238-Flow Index at 230° C., 2.16 kg load, of 5), 200 g of maleic anhydride 36 g of benzoyl perioxide are introduced into an autoclave. After maintaining at a temperature of 130° C. for 3 hours, a 2.7% grafted PP is obtained, whose melt viscosity, measured at 200° C. with the aid of a Rheomat 30 at a shear rate of 10 s$^{-1}$ is 10 Pa s, while that of Lacqtene 3050 FNI was 1,300 Pa s under the same conditions.

The grafted PP obtained above is mixed, alone or with addition of 1,6-hexanediol, in a chamber of a Brabender blender at a temperature of 178° C.

In both cases the polymers are taken out after 10 minutes' blending and are compression-moulded in the press at 180° C. into plaques 2 mm in thickness from which H3-type tensile test specimens are cut out (French Standard NFT No. 51,034). The stress and the extension at break of these specimens are then measured by pulling at a rate of 1.42 mm/minute.

In addition, the melt viscosity of these polymers is measured.

| Weight of PPg in g | Weight of 1,6-hexanediol in g | MR = $\frac{[OH]}{[MA]}$ | Break stress in MPa | Melt viscosity at 200° C. in Pa s |
|---|---|---|---|---|
| 45 | 0 | 0 | brittle-unmeasurable | 10 |
| 44.783 | 0.217 | 0.3 | 26 | 4,500 |

Here are the results obtained:

It can be seen that the break stress, which is practically zero for grafted PP, has increased to a value of 26 by the addition of hexanediol (its value for the same polypropylene, ungrafted, is 22 N/mm²).

EXAMPLE 2

By using an operating procedure similar to that of Example 1, 4.1% of maleic anhydride are grafted onto a propylene/ethylene block copolymer sold by ATOCHEM under the name Lacqtene P 3050 MN4 (Flow Index of 5 at 230° C., 2.16 kg load).

This grafted copolymer, whose melt viscosity is 100 Pa s at 200° C. at 10 s⁻¹ is then blended in the same Brabender blender as that in Example 1, still at a temperature of 178° C., alone or with various reactants: 1-dodecanol, polyoxytetramethylene glycol (PTMG), polyoxyethylene glycol (PEG), and alpha,omega-diamino polyamide 11 oligomer (di-NH₂ PA) of a molecular mass of 1,050, produced by polycondensation of 11-aminoundecanoic acid in the presence of hexamethylenediamine, according to the operating procedure described in French Patent Application No. 84 13,244.

The resistance torque of the blender is recorded after 10 minutes' mixing at 178° C. and, as in Example 1, the properties of plaques moulded from the polymers produced by the blending are measured.

The results entered in Table I show that, in the majority of cases, an increase in the physical properties is obtained relative to the copolymer 3050 MN4 (resistance torque : 1.35 kg/m, break stress: 22.5 N/mm², extension: 130%).

The addition of a monofunctional reactant such as 1-dodecanol produces no improvement.

| Weight of PPg in g | Weight of EVA OH in g | $MR = \frac{[OH]}{[MA]}$ | Flow index at 190° C., 2.16 kg load |
|---|---|---|---|
| 45.00 | 0 | 0 | 26.3 |
| 44.55 | 0.45 | 0.15 | 21.8 |
| 43.65 | 1.35 | 0.46 | 18.2 |
| 42.75 | 2.25 | 0.79 | 6.6 |

This example shows that, in the case of a polymeric reactant bearing secondary alcohol groups, the chain extension phenomenon occurs at molar ratios below unity.

EXAMPLE 4

As in Example 2, Lacqtene P 3050 MN 4 is modified by grafting, but 3.8% of maleic anhydride are grafted this time. The PPg produced has a melt viscosity of 100 Pa s measured at 200° C. with a Rheomat 30.

It is then blended, alone or with the following reactants, at 180° C. for 15 minutes in the Brabender blender:

epoxy resin DER 732, alpha,omega-diepoxy polypropylene glycol, marketed by the Dow Chemical Company, having the following properties:
viscosity at 25° C.: 55 to 100 cP;
weight, in grammes, of resin containing 1 gramme equivalent of epoxy : 305-335;
random ethylene/glycidyl methacrylate copolymer (E/GMA) with a content of 5% of GMA by weight.
The results obtained are listed in Table II.

EXAMPLE 5

TABLE I

| | REACTANT | | | | MECHANICAL PROPERTIES | |
|---|---|---|---|---|---|---|
| Weight of PPg in g | Nature | Weight in g | $MR = \frac{[OH]}{[MA]}$ | Resistance torque in kg m | Break stress in MPa | Elongation at break in % |
| 45 | / | 0 | 0 | 0.17 | not measurable | 0 |
| 43.31 | 1-dodecanol | 1.69 | 0.5 | 0.14 | not measurable | 0 |
| 41.75 | " | 3.25 | 1.0 | 0.14 | not measurable | 0 |
| 42.12 | PTMG Mn̄ = 650 | 2.88 | 0.5 | 1.90 | 28 | 315 |
| 39.59 | " | 5.41 | 1.0 | 2.40 | 28 | 310 |
| 42.33 | PEG Mn̄ = 600 | 2.67 | 0.5 | 1.64 | 24 | 330 |
| 41.50 | PEG Mn̄ = 2,000 | 3.50 | 0.2 | 0.75 | 15 | 37 |
| 37.18 | " | 7.82 | 0.5 | 0.90 | 18 | 390 |
| | | | $MR = \frac{[NH_2]}{[MA]}$ | | | |
| 44.03 | dl-NH₂PA Mn̄ = 1,050 | 0.97 | 0.1 | 0.32 | 15 | 0 |
| 40.53 | " | 4.47 | 0.5 | not measurable too high | 20 | 0 |

EXAMPLE 3

As in Example 2, Lacqtene P 3050 MN4 is modified by grafting, but in this case only 1.3% of maleic anhydride are grafted on; the PPg obtained has a flow index of 26.3 at 190° C., 2.16 kg load.

It is then blended for 10 minutes at 180° C. with a hydrolysed ethylene/vinyl acetate copolymer (containing 28% of vinyl acetate) (EVA OH) whose molar equivalent of the hydroxy group, measured by infrared analysis, is 0.2 mole OH/100 g of resin.

Still in the same blender, the PPg of Example 4 is stirred alone or with 1,6-hexamethylene diisocyanate (HMDI) of Mw=168.

| Weight of PPg in g | Weight of HMDI in g | $MR = \frac{[isocyanate]}{[MA]}$ | Resistance torque in kg m |
|---|---|---|---|
| 45 | 0 | 0 | 0.12 |
| 43.58 | 1.42 | 1 | not measurable |

The increase in torque clearly reflects the mutual reactivity of the two components, which produce a polymer in the form of powder.

TABLE II

| REACTANT | | | | | MECHANICAL PROPERTIES | |
|---|---|---|---|---|---|---|
| Weight of PPg in g | Nature | Weight in g | MR = [epoxy]/[MA] | Resistance torque of the blender in kg m | Break stress in MPa | Elongation at break in % |
| 45 | / | 0 | 0 | 0.12 | not measurable | 0 |
| 43.6 | DER 732 | 1.4 | 0.25 | 0.39 | not measurable | not measurable |
| 42.28 | " | 2.72 | 0.50 | 0.63 | 20.2 | 5 |
| 36.84 | EG MA | 8.16 | 0.2 | 0.38 | not measurable | 4 |
| 28.95 | " | 16.05 | 0.5 | 0.58 | 14 | 10 |
| 21.35 | " | 23.65 | 1.0 | 0.72 | 11.8 | 22.5 |
| 2.25 | " | 42.75 | 17.2 | 0.32 | 8.0 | 550 |
| 0 | " | 45 | infinite | 0.26 | 7.6 | 602 |

EXAMPLE 6

Maleic anhydride is grafted on a random copolymer of propylene and ethylene, in the following manner:
5,500 of monochlorobenzene
1,200 g of Lacqtene 3020 GN3 (copolymer containing 95 mol % of propylene and 5 mol % of ethylene, sold by Atochem—melt index ASTM D 1238 at 230° C., under 2.16 kg, equal to 2)
200 g of maleic anhydride
36 g of benzoyl perioxide are introduced into an autoclave.

After being maintained for 3 hours at a temperature of 130° C., a 3.4% grafted polypropylene is obtained whose melt viscosity, measured at 200° C. with the aid of a Rheomat 30 at a shear rate of 10 s$^{-1}$ is 9 Pa s, while that of the Lacqtene 3020 GN3 was 1,500 Pa s under the same conditions.

278.4 g of the grafted polypropylene obtained above are placed in a beaker at a temperature of 200° C.

In another beaker, 21.6 g of a polyoxyethylene glycol with a number average molecular mass of 600 are heated to 80°-100° C. The molar ratio [OH]/[MA] is 0.75 under these conditions.

The PEG of Mn=600 is poured into the beaker containing the grafted polypropylene. Mixing is carried out by hand with the aid of a glass stirrer for 90 seconds. During the mixing, the viscosity of the medium increases until a pale yellow homogeneous liquid is obtained; this liquid is cast in a steel mould 160×160×2 mm in size, which is maintained at 200° C. for 15 minutes between the heating platens of a hydraulic press producing a pressure of 12 tonnes. After cooling and demoulding, a pale yellow plaque is obtained.

The mechanical properties of the material are given in Table III.

EXAMPLE 7

The same operating procedure as in the preceding example is followed, but using, as reactant, a polyoxyethylene glycol of number average molecular mass of 2,000, with the following quantities:
polypropylene grafted with 3.4% MA: 238.2 g
PEG Mn=2,000:61.8 g

MR=[OH]/[MA]=0.75

The mechanical properties of the material are given in Table III.

EXAMPLE 8

The same operating procedure as in the preceding example is followed, but using, as reactant, an alpha, omega-diamino polyamide 11 oligomer (di-NH$_2$ PA) of number average molecular mass 6,621, with the following quantities:
polypropylene grafted with 3.4% of MA: 193.8 g
di-NH$_2$ PA, Mn=6,621:106.2 g

MR=[NH$_2$]/[MA]=0.5

In this case, the mixing time should not exceed 10 seconds; the homogeneous and viscous mixture obtained is poured into a mould. The total duration of the operations of mixing the components and filling the mould should not exceed 30 seconds.

The plaque obtained is homogeneous and translucent. The mechanical properties of the material are given in Table III.

EXAMPLE 9

The same operating procedure as in the preceding example is followed, but using, as reactant, bisphenol A digly-cidyl ether (DGEBA: M$_w$=352) sold by Dow Chemical under the reference DER 332, with the following quantities:
polypropylene grafted with 3.4% of MA: 291 g
DER 332 : 9 g

MR=[EPOXY]/[AM]=0.5

The given quantity of DER 332 is poured into the beaker containing the grafted polypropylene, previously heated to 200° C. Mixing is carried out manually for 90 seconds by means of a glass stirrer. During the mixing, the viscosity of the mixture increases until a homogeneous yellow liquid is obtained. This resin is poured into a steel mould which is maintained at 200° C. for 15 minutes under a pressure of 12 tonnes. After cooling and demoulding, a yellow-coloured plaque is obtained.

The mechanical properties of the material are given in Table III.

TABLE III

| | BREAK STRESS IN Mpa | ELONGATION AT BREAK, IN % |
|---|---|---|
| EXAMPLE 6 | 18.5 | 250 |
| EXAMPLE 7 | 13.0 | 270 |
| EXAMPLE 8 | 20 | 0 |
| EXAMPLE 9 | 15 | 0 |

TABLE III-continued

| | BREAK STRESS IN Mpa | ELONGATION AT BREAK, IN % |
|---|---|---|
| CONTROL - pure Ppg | not measurable | 0 |

EXAMPLE 10

A Martin Sweets reaction-injection-moulding (RIM) machine, of the Flexamatic RHPI type, is employed to produce moulded plaques, by rection of the PP grafted with maleic anhydride of Example 6 with polyoxyethylene glycol of number average molecular weight 600.

The machine consists of the following components:

a double-entry mixing head which, in an open position, ensures intimate mixing of the two reactants and their transfer towards the mould described below and, in a closed position, ensures recirculation, without mixing, of each of the reactants towards the lines A and B which are described below;

a square mould 305×305×3 mm in size, supplied with the mixture produced in the mixing head;

two lines A and B, connected to the mixing head, each comprising a storage volume for either of the reactants and a hydraulically-controlled metering unit. This metering unit permits either a closed-circuit recirculation between the storage volume and the mixing head in the closed position, of the reactant in the line, without mixing with the reactant in the other line, or the injection of the reactant into the mixing head in the open position, the delivery pressure simultaneously permitting intimate mixing with the reactant coming from the other line and flow of the mixture into the mould. A detailed description of the principle of the RIM machines is to be found in the work: Introduction to Reaction Injection Molding, Technomic Publ. Co. Inc. 1979—pp. 77 to 126.

All the machine components may be controlled up to a temperature of 235° C., and the operating temperature of each component may be fixed independently of those of the other components.

The molar ratio of the two reactants and the homogeneity of the mixture are determined by modifying, on the one hand, the settings of the metering units in each line and, on the other hand, the diameter of the valve connecting each line to the mixing head.

The conditions of the tests carried out with the RIM machine are collated in Table No. IV.

The mould is perfectly filled and the plaques obtained have good surface appearance and excellent homogeneity. The properties of the material obtained are given in Table No. V.

TABLE IV

| LINE A PPg VISCOSITY 9 Pa S at 200° C. | | LINE B | | MIXING TEMPERATURE in °C. | MOULD | | |
|---|---|---|---|---|---|---|---|
| Flow rate g s$^{-1}$ | Temperature °C. | Flow rate g s$^{-1}$ | Temperature °C. | | TEMPERATURE °C. | FILLING TIME in s | HOLDING TIME in s |
| 111 | 200 | PEG Mn: 600 8.6 | 140 | 200 | 190 | 4 | 600 |
| 95.3 | 200 | PEG Mn: 2,000 24.7 | 140 | 200 | 190 | 4 | 600 |

TABLE V

| WEIGHT COMPOSITION (%) | | MOLAR RATIO [OH] / [MA] | PROPERTIES OF THE PLAQUES OBTAINED | | | | | |
|---|---|---|---|---|---|---|---|---|
| | | | TRACTION (ASTM D 638) | | FLEXURE (ASTM D 790) | | | |
| PPg | PEG Mn | | BREAK STRESS MPa | EXTENSION AT BREAK % | MAX. DEFLECTION UNDER LOAD mm | MAX. STRESS UNDER LOAD MPa | ELASTICITY MODULUS MPa | SHORE D HARDNESS (ISO D 868) |
| 92.8 | PEG 600 7.2 | 0.75 | 18 | 250 | 9.6 | 26.8 | 650 | 69 |
| 79.4 | PEG 2000 20.6 | 0.75 | 13 | 250 | 9.3 | 17.9 | 570 | 67 |

EXAMPLE 11

Manufacture of a composite material

The grafted PP of Example 2 is reduced to fine powder by grinding and the powder thus obtained is made into a paste with polyoxyethylene glycol of molecular mass 600, in a proportion of 6.3 g per 100 g of Ppg, which corresponds to a molar ratio [OH]/[MA] of 0.5.

The pasty powder is deposited by dusting on a mat made of long glass fibres of the Owens Corning Fiberglas 8610 type at 900 g/m².

This powder-impregnated mat is then placed between two pre-extruded sheets 1 mm in thickness, made of a standard polhypropylene (Lacqtene P 3030 FN1—Atochem) of melt index 3, measured at 230° C. under 2.16 kg in accordance with the ASTM standard 1238.

The above operation is repeated so as to obtain a stack of three mat layers impregnated with powders and four sheets of standard polypropylene 1 mm thick.

The whole is preheated to 200° C. for 3 minutes between the platens of a press and then compressed at the same temperature under 25 bars for 1 minute. The whole is then cooled to 80° C. under pressure. A 3.3 mm composite is obtained.

By way of comparison, a composite of identical structure is prepared under the same conditions, starting only with glass matting and standard polypropylene, the thickness of the polypropylene layers being corrected in order to obtain a composite identical in thickness and glass content.

The results of the mechanical tests carried out on these products are given in the following table:

|  |  | COMPARATIVE TEST |
|---|---|---|
| Glass fibres, weight % | 45 | 45 |
| TRACTION Tensile strength, Mpa | 125 | 87 |
| FLEXURE |  |  |
| Max. stress Mpa | 150 | 100 |
| Elasticity modulus Mpa | 6,450 | 5,146 |

COATING OF METAL ARTICLES

In the coating field, the resins according to the invention may be subjected to the same techniques as those employed for polyamide powders but, in contrast to the latter, it is possible to obtain coatings having high adhesion to steel without the need for a preliminary treatment of the metal substrate with an undercoat intended to permit good bonding with the polyamide coating. Different techniques are possible for producing these coatings: it is possible to use a powder obtained by grinding the homogeneous prepolymer obtained by mixing in a suitable compounding machine, in melt form, the Ppg oligomer and the reactant R, as defined earlier. It is also possible to employ a powder consisting of a mechanical mixture, produced cold, of, on the one hand, the Ppg oligomer and, on the other hand, the reactant R. Coating of the substrate using these powders may be carried out in accordance with the known coating techniques, for example by electrostatic spraying, followed by a cure for a few minutes at an elevated temperature of between 200 and 250° C., or by dipping the substrate, preheated to a high temperature, in a fluidised bed in which the powder is kept in suspension.

EXAMPLE 12

Maleic anhydride is grafted onto a propylene/ethylene block copolymer in accordance with the operating procedure described in Example 2. The grafted PP obtained is reduced to a fine powder, of a particle size (measured in a Coulter counter) below 80 microns, by being passed through a grinder.

13 g of a polyoxyethylene glycol of number average molecular mass 600 are then dissolved separately in 34 g of 2-ethoxyethyl acetate. 100 g of grafted PP, such as described earlier, are added. The molar ratio [OH]/[MA] is 1.

A dispersion is produced with a turbine over 5 to 10 minutes. this dispersion is applied with the aid of an 80 micron gauge to a degreased aluminium plate. The plate coated in this way is placed in an oven at 200° C. for 3 minutes and then cooled by immersion in water. A film 20 microns in thickness, with very good resistance to methyl ethyl ketone is obtained.

The film is transparent, semi-glossy and has excellent adhesion, together with excellent mechanical properties.

In a comparative test, the grafted PP is employed by itself without PEG. The film obtained is brittle and consequently unsuitable for producing a coating.

EXAMPLE 13

10 g of DGEBA epoxide resin/-Epikote 828 from Shell, the epoxy equivalent weight of which (resin weight corresponding to 1 mol of epoxy) is 187, are dissolved in 100 g of 2-butoxyethyl acetate (commercial butyl glycol acetate), and then 120 g of Ppg of Example 2 are dispersed in this solution with a turbine for 5 to 10 minutes.

The viscosity is then reduced by adding 200 g of butyl glycol acetate.

The molar ratio [Epoxy]/[MA] is 1.

The dispersion obtained is applied, using an 80 micron gauge, on a degreased aluminium plate. The plate coated in this way is stoved for 3 minutes at 200° C. and then cooled by immersion in water. A film 20 microns in thickness, with good resistance tomethyl ethyl ketone, is obtained. This film is transparent, semi-glossy and has an excellent adhesion, together with very good mechanical properties.

EXAMPLE 14

250 g of Ppg from Example 2 are mixed dry with 90 g of Epikote 3003 epoxide resin (epoxy equivalent weight 725–825) (Shell), previously ground, and 0.5 g of alumina. The powder obtained is applied with an electrostatic (+60 kV) spray gun onto a degreased smooth steel plate. The plate is stoved for 5 minutes at 200° C. A film 30/35 microns in thickness is obtained, which is transparent, semi-glossy and which covers the ridges well.

The methyl ethyl ketone resistance of this film, its adhesion to the steel plate and its mechanical properties are good.

I claim:

1. A polymer obtained from the reaction of (a) an anhydride grafted polypropylene, having a melt viscosity below 500 Pa s, measured at 200° C. at a shear rate $10s^{-1}$, essentially free of residual monomeric carboxylic acid anhydride, and (b) a compound R possessing at least two identical or non-identical groups reactive towards an anhydride group, the respective quantities of said grafted polypropylene and said compound R being such that their molarity ratio, defined as the ratio of the number of reactive groups carried by the compound R to the number of anhydride groups carried by the grafted polypropylene, is between 0.01 and 2.

2. Polymer according to claim 1, wherein the polypropylene is grafted with maleic anhydride.

3. Polymer according to claim 1, wherein the compound R belongs to the group consisting of polyols, polyamines, polyepoxides and polyisocyanates and has a molecular weight of less than 50,000.

4. Polymer according to claim 1, characterised in that the compound R is 1,6-hexanediol.

5. Polymer according to claim 1, characterised in that the compound R belongs to the group consisting of polyoxyethylene glycols and polyoxytetramethylene glycols.

* * * * *